US010723046B2

(12) United States Patent
Sugimoto et al.

(10) Patent No.: US 10,723,046 B2
(45) Date of Patent: Jul. 28, 2020

(54) SURFACE FASTENER MOLDING APPARATUS AND ITS OPERATIONAL METHOD, AND A METHOD FOR PRODUCING A SURFACE FASTENER

(71) Applicant: YKK Corporation, Tokyo (JP)

(72) Inventors: Atsunori Sugimoto, Toyama (JP); Toru Umekawa, Toyama (JP); Masashi Daidoji, Tokyo (JP)

(73) Assignee: YKK Corporation (JP)

( * ) Notice: Subject to any disclaimer, the term of this patent is extended or adjusted under 35 U.S.C. 154(b) by 0 days.

(21) Appl. No.: 16/407,431

(22) Filed: May 9, 2019

(65) Prior Publication Data

US 2019/0263030 A1    Aug. 29, 2019

Related U.S. Application Data

(63) Continuation of application No. 14/912,625, filed as application No. PCT/JP2013/076147 on Sep. 26, 2013, now abandoned.

(51) Int. Cl.
*A44B 18/00* (2006.01)
*B29C 41/26* (2006.01)
(Continued)

(52) U.S. Cl.
CPC ............ *B29C 41/26* (2013.01); *B29C 41/36* (2013.01); *B29C 41/52* (2013.01); *B29C 43/222* (2013.01);
(Continued)

(58) Field of Classification Search
CPC ......... B29C 41/26; B29C 41/36; B29C 41/52; B29C 41/58; B29C 41/54; B29C 43/245;
(Continued)

(56) References Cited

U.S. PATENT DOCUMENTS 3,422,494 A    1/1969 Camhi
5,690,875 A *  11/1997 Sakakibara ........ A44B 18/0049
                                            264/146
(Continued)

FOREIGN PATENT DOCUMENTS

EP    1535713 A1    6/2005
GB    1073830       6/1967
(Continued)

OTHER PUBLICATIONS

*U.S. Appl. No. 14/912,625, Final Office Action, dated Feb. 25, 2019, 17 pages.
(Continued)

*Primary Examiner* — Jacob T Minskey
*Assistant Examiner* — Cedrick S Williams
(74) *Attorney, Agent, or Firm* — Kilpatrick Townsend & Stockton LLP

(57) ABSTRACT

A surface fastener molding apparatus includes a supporting structure and a second supporting structure for axially supporting a mold roll in a rotatable manner at a first end side and a second end side of the mold roll which is opposite to the first end side. The mold roll includes a circumferential surface in which a plurality of mold cavities for molding engaging elements of the surface fastener is provided. A first linear driving means and second linear driving means are provided which are for, respectively, advancing or retracting the first supporting structure and the second supporting structure. The degree of closeness between the extruding nozzle and the mold roll is regulatable across the first end side and the second end side of the mold roll, based on at least one activation of the first driving means and the second driving means.

12 Claims, 13 Drawing Sheets

(51) Int. Cl.
   *B29C 43/58* (2006.01)
   *B29C 43/46* (2006.01)
   *B29C 43/22* (2006.01)
   *B29C 41/36* (2006.01)
   *B29C 41/52* (2006.01)
   *B29L 31/00* (2006.01)

(52) U.S. Cl.
   CPC .............. *B29C 43/46* (2013.01); *B29C 43/58* (2013.01); *A44B 18/0049* (2013.01); *B29C 2043/465* (2013.01); *B29C 2043/5825* (2013.01); *B29C 2043/5875* (2013.01); *B29L 2031/729* (2013.01)

(58) Field of Classification Search
   CPC ......... B29C 43/58; B29C 43/54; B29C 41/24; A44B 18/00; A44B 18/0015; A44B 18/0007; A44B 18/0019; A44B 18/0003; A44B 18/0038; A44B 18/0042; A44B 18/0049; A44B 18/0053
   See application file for complete search history.

(56) References Cited

U.S. PATENT DOCUMENTS

| | | |
|---|---|---|
| 5,945,131 A | 8/1999 | Harvey et al. |
| 2003/0041957 A1 | 3/2003 | Harvey et al. |
| 2006/0145396 A1 | 7/2006 | Okada et al. |
| 2006/0260484 A1* | 11/2006 | Mizunuma ............ B29C 43/245 101/216 |
| 2007/0035060 A1* | 2/2007 | Harvey ............... A44B 18/0049 264/167 |
| 2008/0182091 A1 | 7/2008 | Guenanten et al. |
| 2013/0048443 A1* | 2/2013 | Muramatsu ............. F16D 65/18 188/72.1 |
| 2016/0193757 A1 | 7/2016 | Sugimoto et al. |

FOREIGN PATENT DOCUMENTS

| | | |
|---|---|---|
| JP | 8-174693 A | 7/1996 |
| JP | 2002-514141 A | 5/2002 |
| JP | 2008-539100 A | 11/2008 |
| WO | 98/46406 A1 | 10/1998 |
| WO | 2006/117018 A1 | 11/2006 |

OTHER PUBLICATIONS

*U.S. Appl. No. 14/912,625, Non-Final Office Action, dated Aug. 10, 2018, 24 pages.
*U.S. Appl. No. 14/912,625, Restriction Requirement, dated Apr. 10, 2018, 10 pages.
International Search Report, PCT Application No. PCT/JP2013/076147, dated Dec. 24, 2013.
International Preliminary Report on Patentability, PCT Application No. PCT/JP2013/076147, dated Apr. 7, 2016.

* cited by examiner

SURFACE FASTENER MOLDING APPARATUS AND ITS OPERATIONAL METHOD, AND A METHOD FOR PRODUCING A SURFACE FASTENER

TECHNICAL FIELD

The present disclosure relates to a surface fastener molding apparatus and its operational method, and a method for producing a surfaces fastener.

BACKGROUND ART

Patent document 1 discloses, as understandable from its FIGS. 1 and 2, a configuration in which a die wheel (2) is provided closer to a extruding nozzle (1), and a surface fastener is continuously molded between the extruding nozzle (1) and the die wheel (2) and then transferred by take-up rolls (6, 7). The die wheel (2) is configured by the stack of ring-shaped plates along a rotational axis as shown in FIG. 3 of the same document.

Patent document 2 discloses, as illustrated in its FIG. 1, a configuration in which resin is supplied and molded between a pressure roll (2) and a mold roll (1). A load roll (3) is provided below the mold roll (1) such that a load applied by means of the pressure roll (2) and the load roll (3) can be regulatable. FIGS. 13 and 13a-13c discloses that the pressure roll (2) is controlled by means of left and right ball screws such that the axis of the pressure roll (2) is skewed relative to the axis of the mold roll (1). Accordingly, a more uniform nip gap can be formed along the mold roll (1). See specification page 30, line 13 from bottom to page 31, line 17 from top.

CITATION LIST

Patent Literature

[PTL 1] Japanese Patent Application Laid-open No. 8-174693
[PTL 2] Japanese Patent Application Laid-open No. 2002-514141

SUMMARY OF INVENTION

Technical Problem

The relative position between the extruding nozzle and the mold roll in the extruding machine may vary due to various factors, and the substrate thickness of the molded surface fastener may possibly fluctuate in some cases.

Solution to Problem

A surface fastener molding apparatus according to an aspect of the present invention may be a surface fastener molding apparatus (100) in which a first supporting structure (50) and a second supporting structure (80) axially support a mold roll (10) in a rotatable manner at the first end side (13) and the second end side (16) of the mold roll (10) which is opposite to the first end side (13), the mold roll (10) including a circumferential surface (11) in which a plurality of mold cavities (12) for molding engaging elements (910) of a surface fastener (900) is provided. The surface fastener molding apparatus (100) includes driving means for advancing or retracting the mold roll (10) relative to an extruding nozzle (450), the advancing of the mold roll (10) toward an extruding mouth (490) of the extruding nozzle (450) defining a mold space for a substrate (910) of the surface fastener (900) between the circumferential surface (11) of the mold roll (10) and an opposed surface of the extruding nozzle (450). The driving means includes first driving means (30) and second driving means (60) for advancing or retracting the first supporting structure (50) and the second supporting structure (80) respectively, wherein the degree of closeness between the extruding nozzle (450) and the mold roll (10) is regulatable across the first end side (13) and the second end side (16) of the mold roll (10) based on at least one activation of the first driving means (30) and the second driving means (60).

In a case where the first driving means (30) comprises a first linear driving means (30) for linearly advancing or retracting the first supporting structure (50), and the second driving means (60) comprises a second linear driving means (60) for linearly advancing or retracting the second supporting structure (80), the first linear driving means (30) and the second linear driving means (60) each may preferably include a ball screw (34, 64) in which a nut (36, 66) is movable along a threaded shaft (35, 65); and a drive source (31, 61) that produces a rotational force transmitted to the threaded shaft (35, 65) of the ball screw (34, 64).

The first end side (13) of the mold roll (10) may preferably be axially supported in a rotatable manner by a first bearing (530) provided at the first supporting structure (50), and the second end side (16) of the mold roll (10) may preferably be axially supported in a rotatable manner by a second bearing (560) provided at the second supporting structure (80).

the first supporting structure (50) and the second supporting structure (80) may preferably be respectively mounted onto one or more linear rails (351, 352, 651, 652).

Each of the first linear driving means (30) and the second linear driving means (60) may preferably further include a speed reducer (32, 62) that decelerates the rotational force generated by the drive source (31, 61) and transmits the reduced rotational force to the threaded shaft (35, 65).

The apparatus may preferably further include controlling means (850) configured to transmit a drive signal to each drive source (31, 61) of the first driving means (30) and the second driving means (60), wherein
one end of the rotational axis (AX10) of the mold roll (10) may preferably pivot relative to the other end of the rotational axis (AX10) based on at least one control of the first driving means (30) and the second driving means (60) by the controlling means (850).

The apparatus may preferably further include first position determining means (353) for determining the positon of the first end side (13) of the mold roll (10); and second position determining means (653) for determining the position of the second end side (16) of the mold roll (10), wherein the controlling means (850) may preferably be configured, based on the output of the first position determining means (353), to transmit a drive signal to the first linear driving means (30) for moving the first supporting structure (50) such that the displacement of the mold roll (10) at the first end side (13) is compensated; and the controlling means (850) may preferably be further configured, based on the output of the second position determining means (653), to transmit a drive signal to the second linear driving means (60) for moving the second supporting structure (80) such that the displacement of the mold roll (10) at the second end side (16) is compensated.

A method of manufacturing a surface fastener according to another aspect of the present invention may be a method of manufacturing a surface fastener by the use of a surface fastener molding apparatus, the surface fastener molding apparatus including: a first supporting structure (50) and a second supporting structure (80) for axially supporting a mold roll (10) in a rotatable manner at a first end side (13) and a second end side (16) of the mold roll (10) which is opposite to the first end side (13), the mold roll (10) including a circumferential surface (11) in which a plurality of mold cavities (12) for molding engaging elements (910) of the surface fastener (900) is provided; and first driving means (30) and second driving means (60) for advancing or retracting the first supporting structure (50) and the second supporting structure (80) respectively, the method including: advancing the mold roll (10) toward an extruding mouth (490) of the extruding nozzle (450) based on activation of the first driving means (30) and the second driving means (60); receiving melted resin being extruded from the extruding mouth (490) of the extruding nozzle (450) by the rotating mold roll (10) so that the mold cavities (12) at the circumferential surface (11) are filled with the melted resin and a substrate of the surface fastener (900) is formed between the circumferential surface (11) of the mold roll (10) and the opposed surface of the extruding nozzle (450); activating at least one of the first driving means (30) and the second driving means (60) in accordance with the thickness of the substrate (910) of the formed surface fastener (900) to regulate the degree of closeness between the extruding nozzle (450) and the mold roll (10) across the first end side (13) and the second end side (16) of the mold roll (10).

The first end side (13) of the mold roll (10) may preferably be axially supported in a rotatable manner by a first bearing (530) provided at the first supporting structure (50), and the second end side (16) of the mold roll (10) may preferably be axially supported in a rotatable manner by a second bearing (560) provided at the second supporting structure (80).

In a case where the first driving means (30) comprises a first linear driving means (30) for linearly advancing or retracting the first supporting structure (50), and the second driving means (60) comprises a second linear driving means (60) for linearly advancing or retracting the second supporting structure (80), the method may include: determining a position of the first end side (13) of the mold roll (10); determining a position of the second end side (16) of the mold roll (10); activating the first linear driving means (30) for compensating the displacement of the first end side (13) of the mold roll (10) based on the determination of the position of the first end side (13) of the mold roll (10); and activating the second linear driving means (60) for compensating the displacement of the second end side (16) of the mold roll (10) based on the determination of the position of the second end side (16) of the mold roll (10).

An operational method of a surface fastener molding apparatus according to another aspect of the present invention may be an operational method of a surface fastener molding apparatus that may include a first supporting structure (50) and a second supporting structure (80) for axially supporting a mold roll (10) in a rotatable manner at a first end side (13) and a second end side (16) of the mold roll (10) which is opposite to the first end side (13), the mold roll (10) including a circumferential surface (11) in which a plurality of mold cavities (12) for molding engaging elements (910) of the surface fastener (900) is provided; and first linear driving means (30) and second linear driving means (60) for advancing or retracting the first supporting structure (50) and the second supporting structure (80) respectively, the method including: advancing the mold roll (10) toward an extruding mouth (490) of the extruding nozzle (450) based on activation of both of the first driving means (30) and the second driving means (60) so that a mold space for a substrate (900) of the surface fastener (900) is defined between the circumferential surface (11) of the mold roll (10) and the opposed surface of the extruding nozzle (450); activating at least one of the first linear driving means (30) and the second linear driving means (60) to regulate the degree of closeness between the extruding nozzle (450) and the mold roll (10) across the first end side (13) and the second end side (16) of the mold roll (10).

The method may preferably include: determining a position of the first end side (13) of the mold roll (10); determining a position of the second end side (16) of the mold roll (10); activating the first linear driving means (30) for compensating the displacement of the first end side (13) of the mold roll (10) based on the determination of the position of the first end side (13) of the mold roll (10); and activating the second linear driving means (60) for compensating the displacement of the second end side (16) of the mold roll (10) based on the determination of the position of the second end side (16) of the mold roll (10).

Advantageous Effects of Invention

According to the present invention, the maintenance of the mold roll may be easier and the stabilization of the substrate thickness of the surface fastener may be facilitated.

BRIEF DESCRIPTION OF DRAWINGS

In FIG. 4, the mold roll is at the operating position and closely facing the extruding nozzle similar to FIG. 3.

DESCRIPTION OF EMBODIMENTS

Hereinafter, embodiments of the present invention will be described with reference to drawings. Respective embodiments are not individually independent, and the skilled person would be able to combine them as appropriately without requiring excess descriptions and would be able to appreciate the synergic effects obtained by such combinations. Duplicative descriptions between embodiments shall be omit in principle. Referenced drawings are mainly for explanatory purposes and may be simplified as appropriately.

In the instant specification, front side/frontward may indicate a direction along which a mold roll moves closer to an extruding nozzle; back side/backward may indicate a direction along which the mold roll moves away from the extruding nozzle. That is, the movement of the mold roll getting closer to the extruding nozzle may indicate "frontward travel", and the movement of the mold roll getting away from the extruding nozzle may indicate "backward travel". The moving direction of the mold roll relative to the extruding nozzle may be referred to as a travel direction. Left-right direction may be a direction parallel to the rotational axis of the mold roll. That is, first end of the mold roll may be a left-side end, and second end opposite to the first end may be a right-side end. Up-down direction may be a direction orthogonal to the travel direction and left-right direction. It should be noted that various manners are envisaged for the definitions of directions, and thus another definition could be made in view of the following detail description.

First Embodiment

Figure 1:
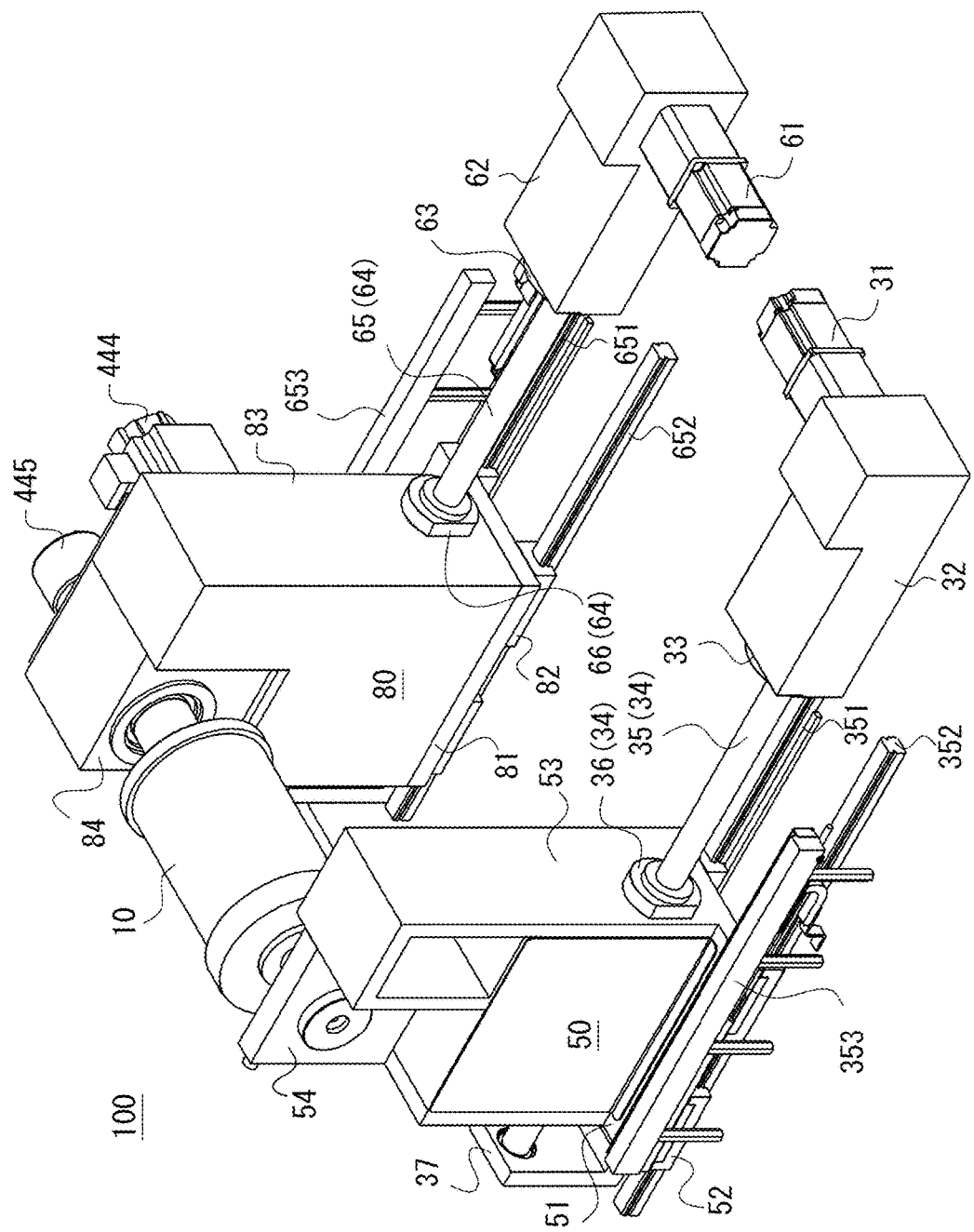
FIG. 1 is a schematic perspective view of a surface fastener molding apparatus according to a first embodiment of the present invention. A mold roll is at an operating position and is closely facing a non-illustrated extruding nozzle. Illustration of a control computer and wirings is omitted in FIG. 1.
Figure 2:
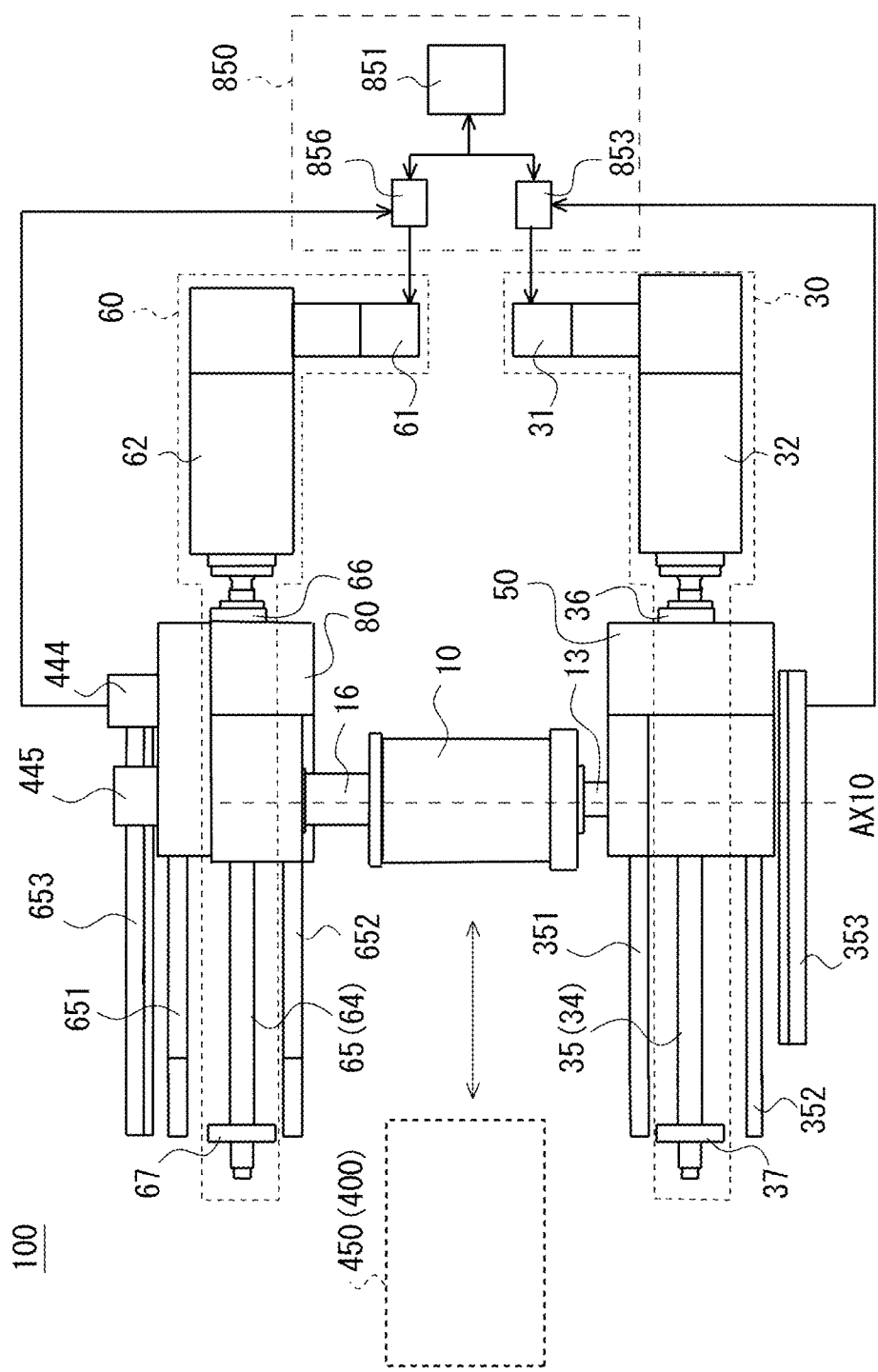
FIG. 2 is a schematic plane view of the surface fastener molding apparatus according to the first embodiment of the present invention, illustrating that the mold roll is at a retracted position and greatly spaced apart from the extruding nozzle.
Figure 3:
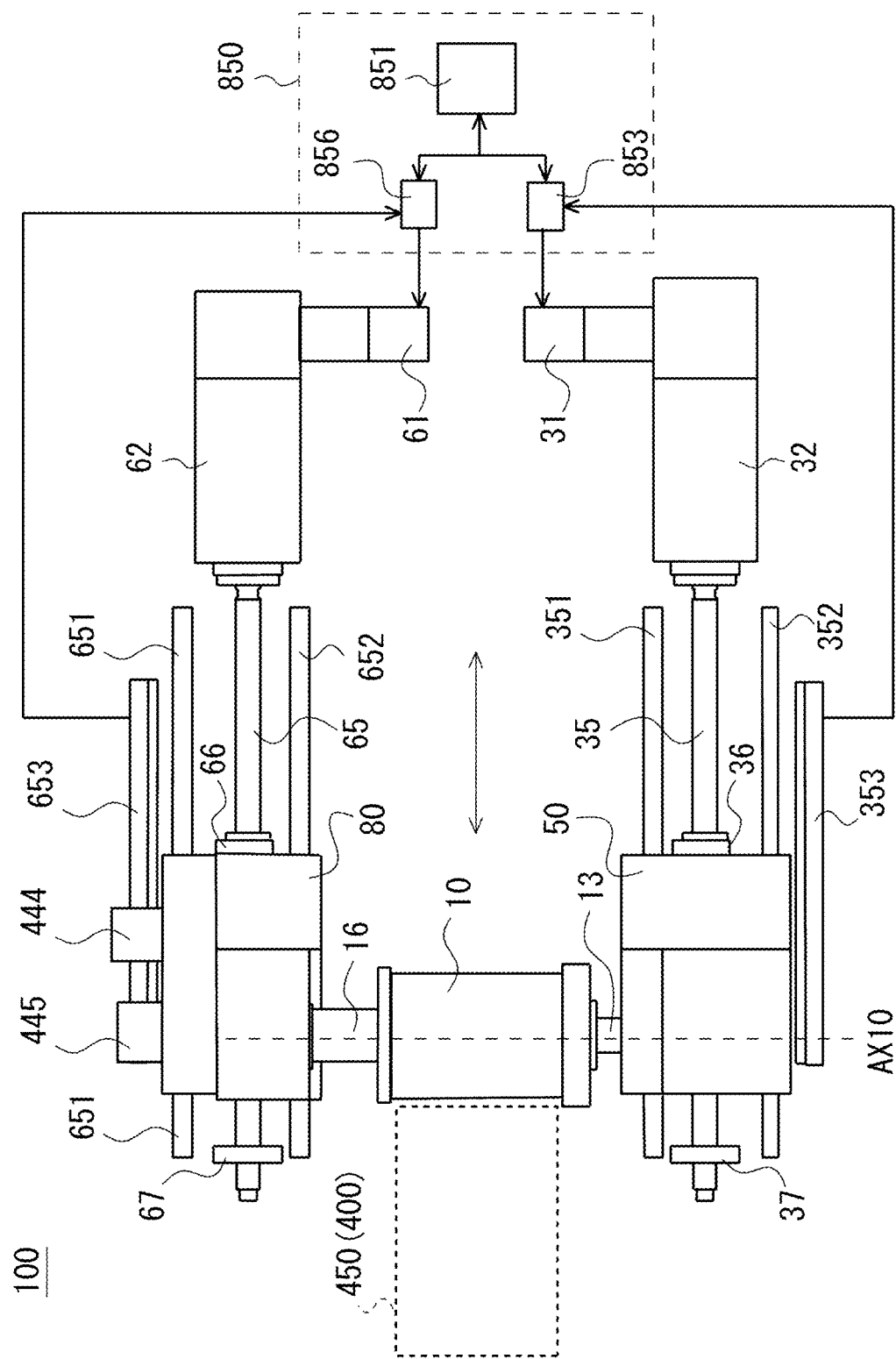
FIG. 3 is a schematic plane view of the surface fastener molding apparatus according to the first embodiment of the present invention, illustrating that the mold roll is at the operating position and closely facing the extruding nozzle.
Figure 4:
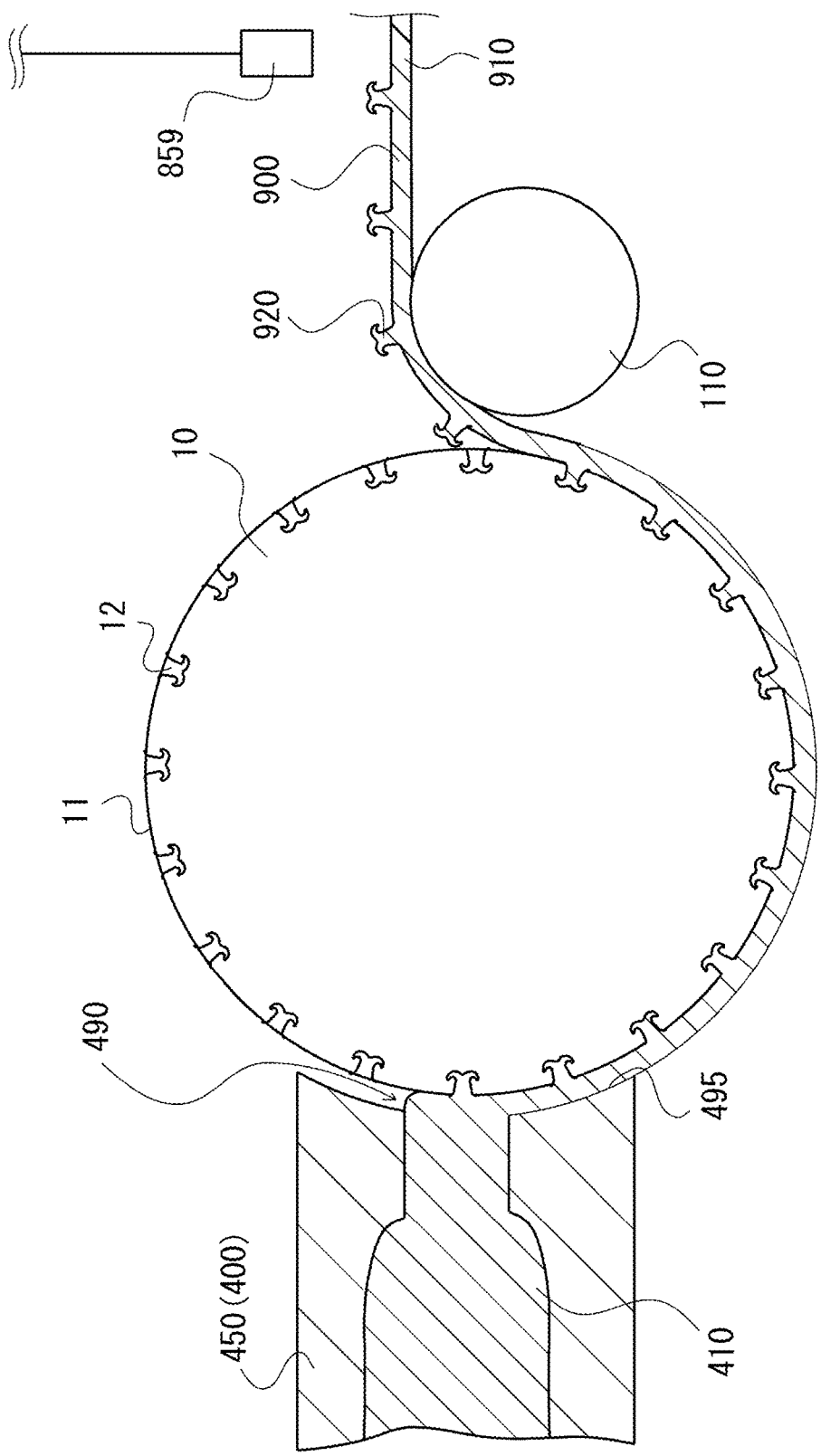
FIG. 4 is a schematic sectional view of the mold roll and pick-up roll of the surface fastener molding apparatus according to the first embodiment of the present invention, additionally illustrating the extruding nozzle in section, and further illustrating a pachymeter located at a downstream side of the pick-up roll.
Figure 5:
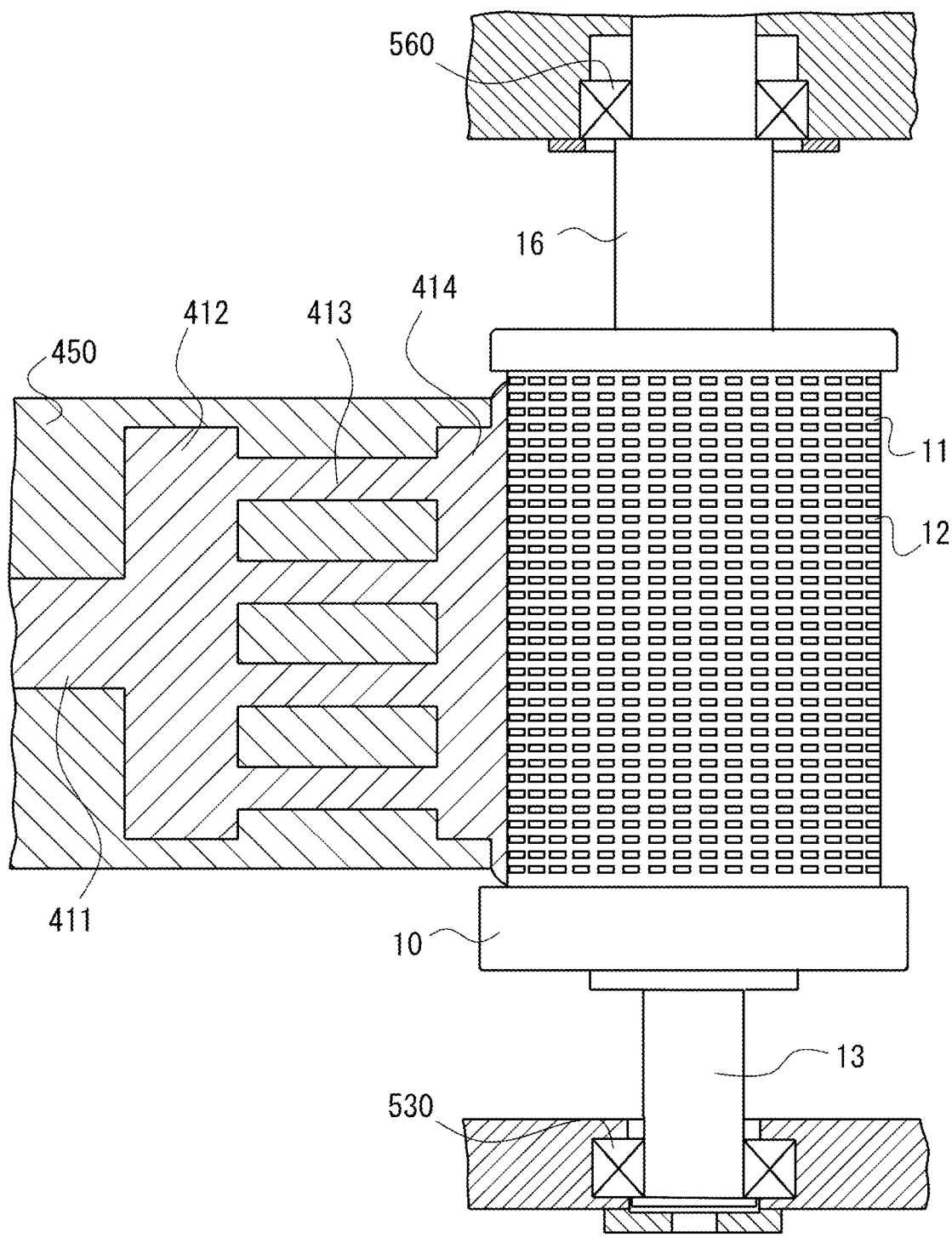
FIG. 5 is a schematic view illustrating the mold roll and the axially-supporting mechanisms for both ends of the mold roll, illustrating that the mold cavities are formed in a circumferential surface of the mold roll. Axially-supporting structures at both ends of the mold roll are schematically illustrated in section, and similarly the extruding nozzle is schematically illustrated in section.
Figure 6:
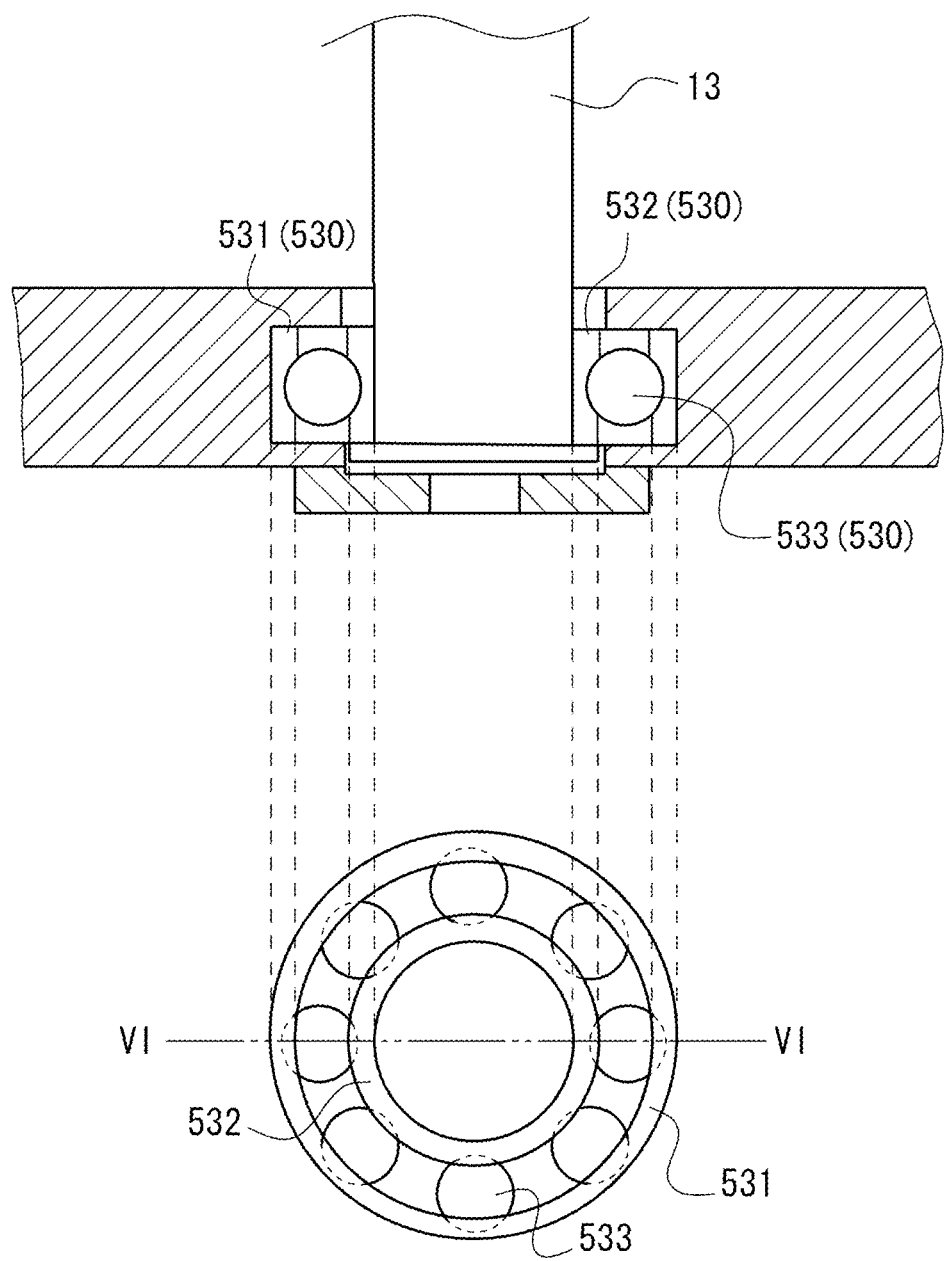
FIG. 6 is a schematic view illustrating, in more detail, the axially-supporting structure for the left end of the surface fastener molding apparatus according to the first embodiment of the present invention, the configuration of a left bearing included in the axially-supporting structure being illustrated.
Figure 7:
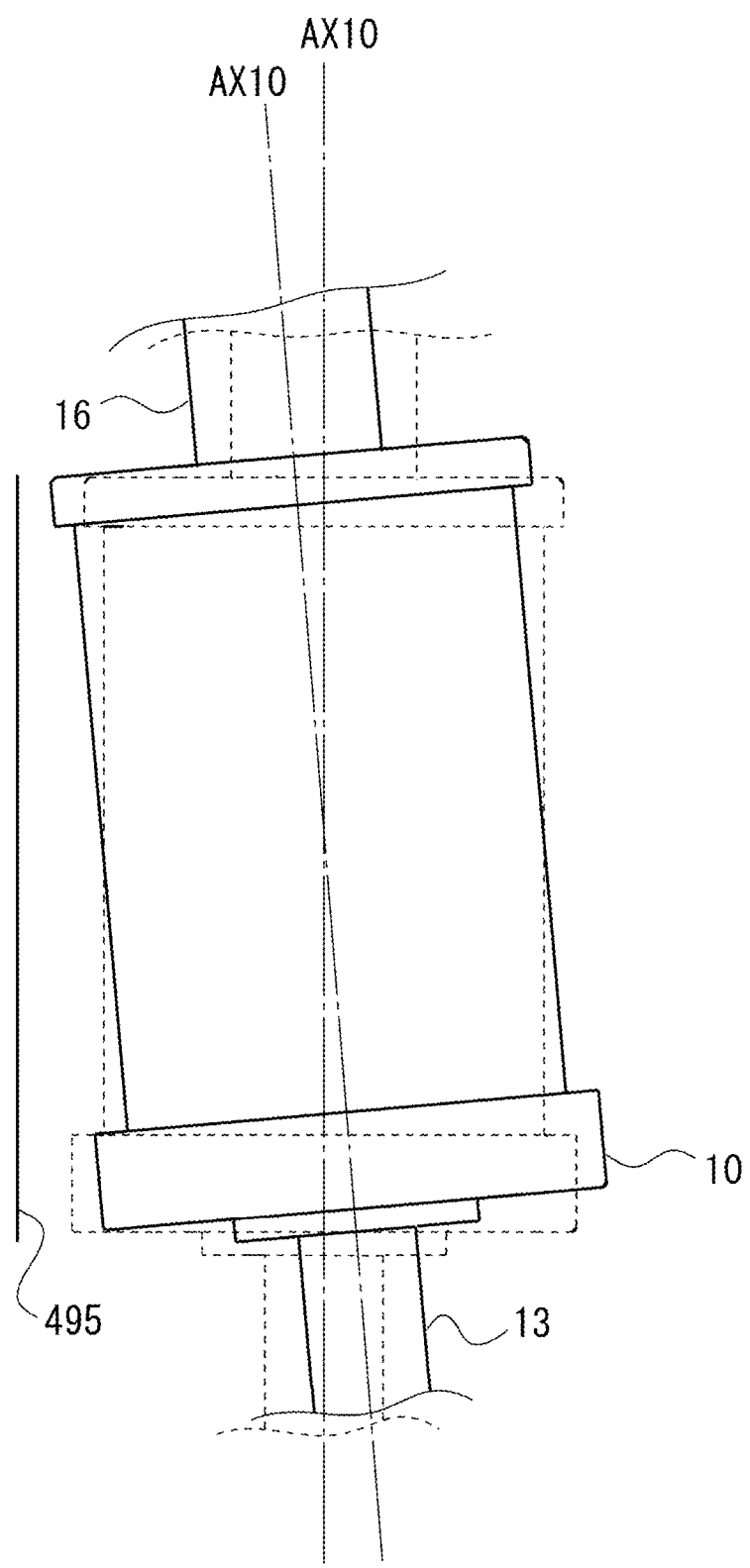
FIG. 7 is a schematic view schematically illustrating a state in which a rotational axis of the mold roll of the surface fastener molding apparatus is pivoted (i.e. an end of the mold roll is moved relative to the other end of the mold roll), illustrating distance between the circumferential surface of the mold roll and the opposed surface of the extruding nozzle being skewed across the both ends of the mold roll. It should be noted that the FIG. 7 is solely schematic and does not show an actual degree of pivoting of the rotational axis.
Figure 8:
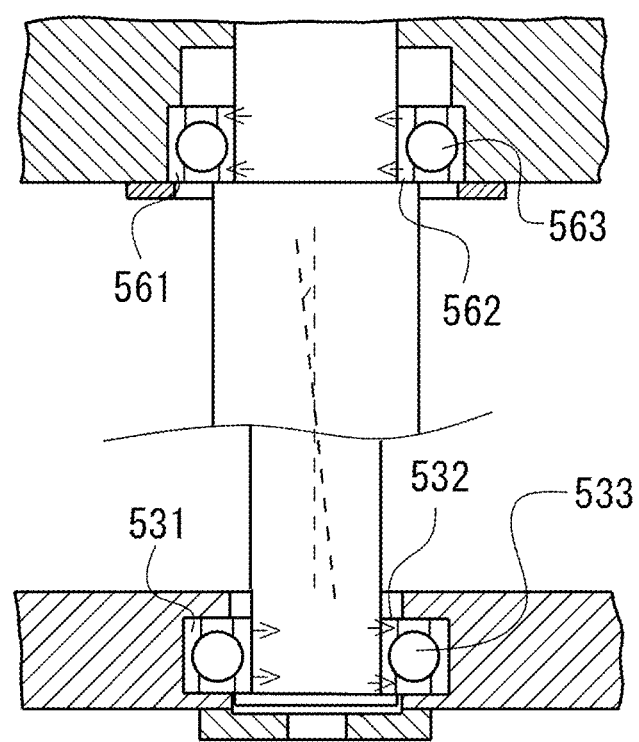
FIG. 8 is an explanatory view schematically illustrating that, in the surface fastener molding apparatus according to the first embodiment of the present invention, force is applied to the left and right bearings in accordance with the degree of counterclockwise pivotal movement of the rotational axis of the mold roll when the figure is viewed in front.
Figure 9:
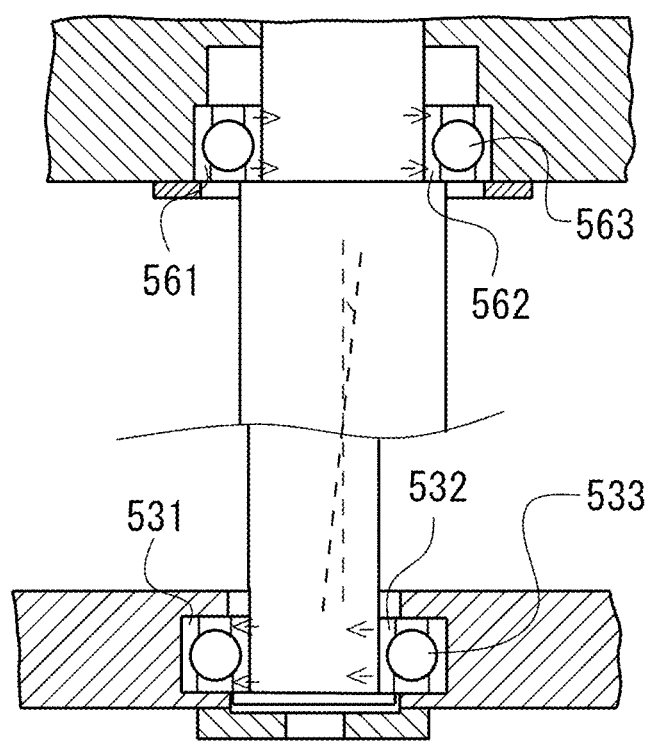
FIG. 9 is an explanatory view schematically illustrating that, in the surface fastener molding apparatus according to the first embodiment of the present invention, force is applied to the left and right bearings in accordance with the degree of clockwise pivotal movement of the rotational axis of the mold roll when the figure is viewed in front.
Figure 10:
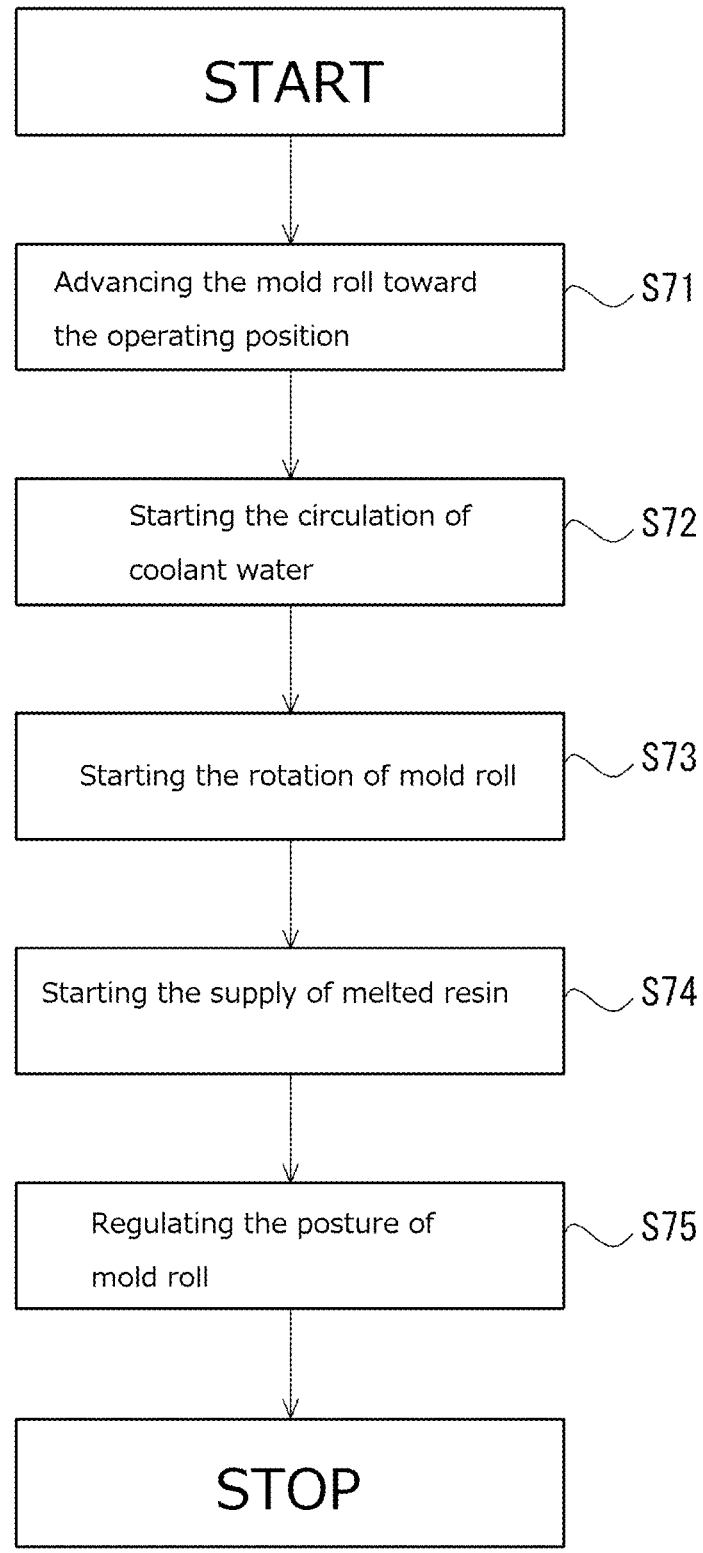
FIG. 10 is a schematic flowchart illustrating an operational method of the surface fastener molding apparatus according to the first embodiment of the present invention.
Figure 11:
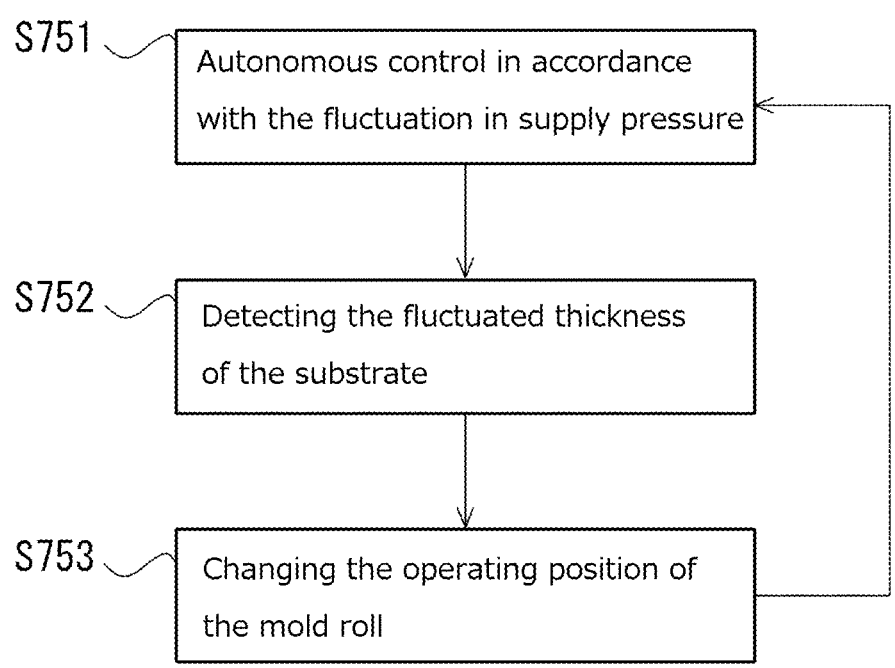
FIG. 11 is a schematic flowchart related to the operational method of the surface fastener molding apparatus according to the first embodiment of the present invention, and is particularly illustrating how the posture of the mold roll is regulated.
Figure 12:
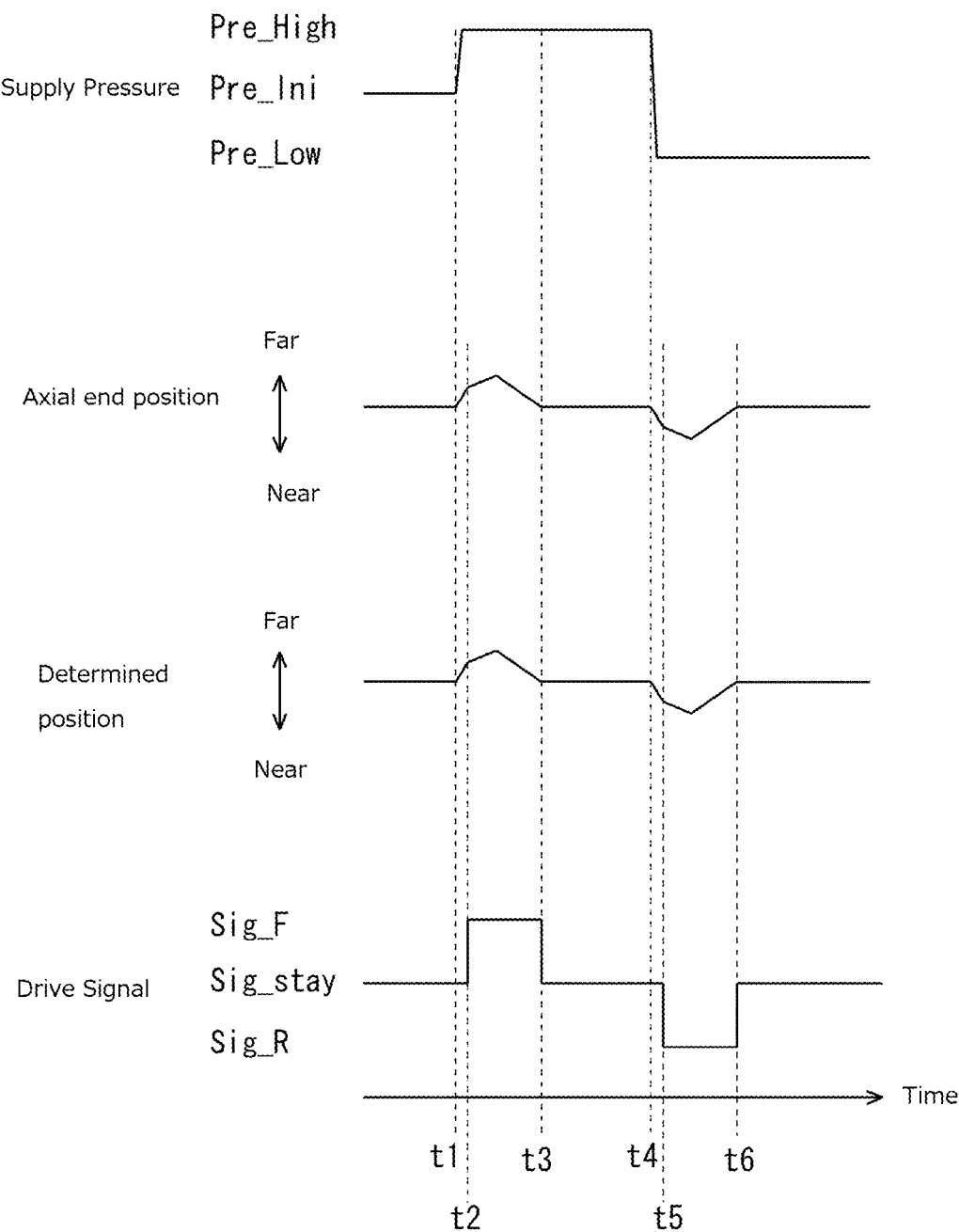
FIG. 12 is a simplified timing chart related to the operational method of the surface fastener molding apparatus according to the first embodiment of the present invention, and is illustrating that the posture of the mold roll is regulated in accordance with the fluctuation of extrusion pressure applied by the extruding nozzle.
Figure 13:
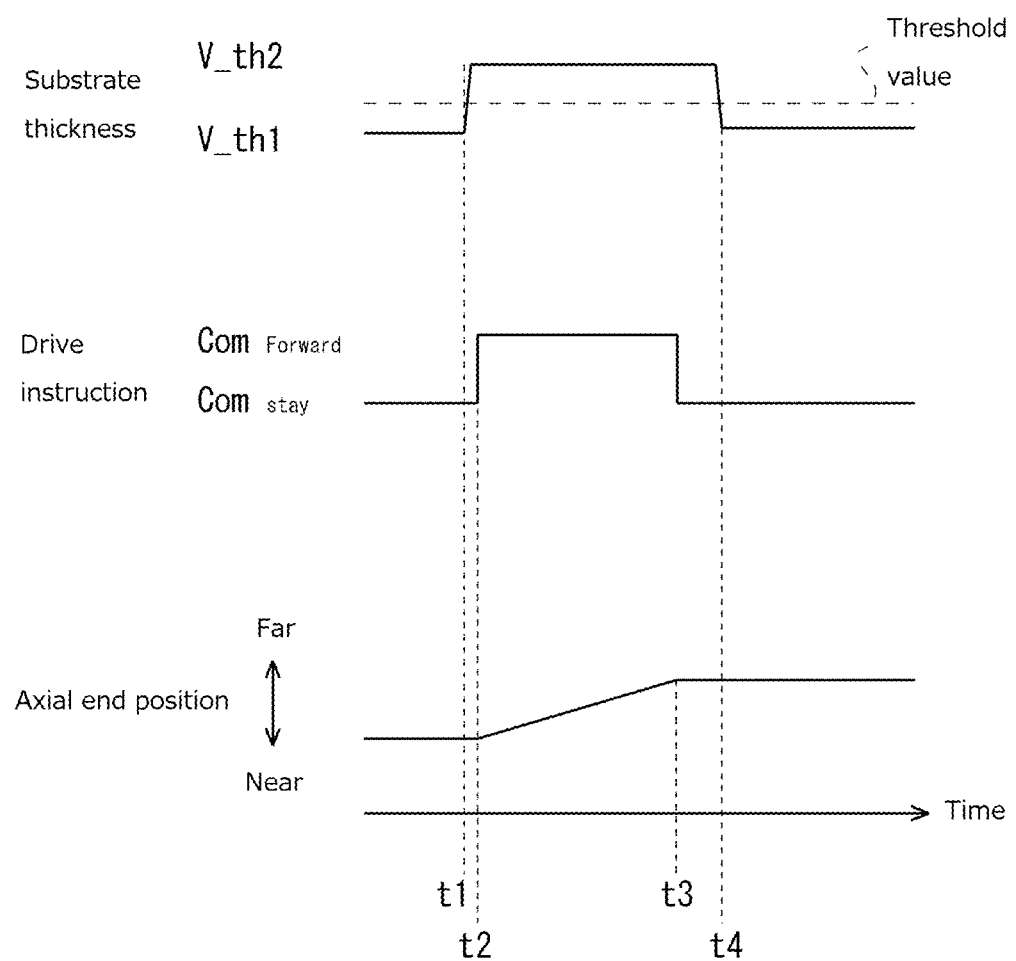
FIG. 13 is a simplified timing chart related to the operational method of the surface fastener molding apparatus according to the first embodiment of the present invention, and is illustrating that the posture of the mold roll is regulated in accordance with the thickness fluctuation of the substrate of the molded surface fastener.

Hereinafter, the first embodiment will be described with reference to FIGS. 1 to 13. FIG. 1 is a schematic perspective view of a surface fastener molding apparatus. A mold roll is at an operating position and is closely facing a non-illustrated extruding nozzle. Illustration of a control computer and wirings is omitted in FIG. 1. FIG. 2 is a schematic plane view of the surface fastener molding apparatus, illustrating that the mold roll is at a retracted position and greatly spaced apart from the extruding nozzle. FIG. 3 is a schematic plane view of the surface fastener molding apparatus, illustrating that the mold roll is at the operating position and closely facing the extruding nozzle. FIG. 4 is a schematic sectional view of the mold roll and pick-up roll of the surface fastener molding apparatus, additionally illustrating the extruding nozzle in section, and further illustrating a pachymeter located at a downstream side of the pick-up roll. In FIG. 4, the mold roll is at the operating position and closely facing the extruding nozzle similar to FIG. 3. FIG. 5 is a schematic view illustrating the mold roll and the axially-supporting mechanisms for both ends of the mold roll, illustrating that the mold cavities are formed in a circumferential surface of the mold roll. Axially-supporting structures at both ends of the mold roll are schematically illustrated in section, and similarly the extruding nozzle is schematically illustrated in section. FIG. 6 is a schematic view illustrating, in more detail, the axially-supporting structure at the left end of the surface fastener molding apparatus, the configuration of a left bearing included in the axially-supporting structure being illustrated. FIG. 7 is a schematic view schematically illustrating a state in which a rotational axis of the mold roll of the surface fastener molding apparatus is pivoted (i.e. an end of the mold roll is moved relative to the other end of the mold roll), illustrating distance between the circumferential surface of the mold roll and the opposed surface of the extruding nozzle being skewed across the both ends of the mold roll. It should be noted that the FIG. 7 is solely schematic and does not show an actual degree of pivoting of the rotational axis. FIG. 8 is an explanatory view schematically illustrating that, in the surface fastener molding apparatus, force is applied to the left and right bearings in accordance with the degree of counterclockwise pivotal movement of the rotational axis of the mold roll when the figure is viewed in front. FIG. 9 is an explanatory view schematically illustrating that, in the surface fastener molding apparatus, force is applied to the left and right bearings in accordance with the degree of clockwise pivotal movement of the rotational axis of the mold roll when the figure is viewed in front. FIG. 10 is a schematic flowchart illustrating an operational method of the surface fastener molding apparatus. FIG. 11 is a schematic flowchart related to the operational method of the surface fastener molding apparatus, and is particularly illustrating how the posture of the mold roll is regulated. FIG. 12 is a simplified timing chart related to the operational method of the surface fastener molding apparatus, and is illustrating that the posture of the mold roll is regulated in accordance with the fluctuation of extrusion pressure applied by the extruding nozzle. FIG. 13 is a simplified timing chart related to the operational method of the surface fastener molding apparatus, and is illustrating that the posture of the mold roll is regulated in accordance with the thickness fluctuation of the substrate of the molded surface fastener.

A surface fastener molding apparatus 100 shown in FIGS. 1 to 5 may axially supports a mold roll 10 and may be configured to advance the mold roll 10 closer to an extruding nozzle 450 of an extruding machine 400 or to backwardly move the mold roll 10 away from the extruding nozzle 450 of the extruding machine 400. The roll 10 may be a metal-made rotator in which a plurality of mold cavities 12 for molding engaging elements 920 of a surface fastener 900 are provided in its circumferential surface 11. The rotator may be provided with a coolant water circulation channel inside thereof and may be cooled when a surface fastener is being molded, thereby facilitating the solidification of melted resin at the circumferential surface 11 of the mold roll 10, i.e. the solidification of the surface fastener 900. It should be noted that the extruding machine 400 may be extremely heavy machine, and may be fixed to a base in a manufacturing room in a factory.

The mold roll 10 may comprise of a number of laminated ring-like plates along the rotational axis similar to FIG. 3 of Patent document 1, the entire content of Patent document 1 being incorporated herein by reference. Any specific shape may be possible for the engaging elements 920 which are molded by the mold cavities 12 of the mold roll 10. The exemplary engaging element 920 shown in FIG. 4 has oppositely extending two heads in an arc over the base, but other shapes such as J-shaped hook and so on may be adopted.

As shown in FIGS. 4 and 5, the surface fastener molding apparatus 100 may advance the mold roll 10 until the mold roll 10 faces the extruding mouth 490 of the extruding nozzle 450 of the extrusion machine 400. Under this state, a mold space for the substrate 910 of the surface fastener 900 is defined between the circumferential surface 11 of the mold roll 10 and a lower arc surface 495 at the extruding mouth 490 of the extruding nozzle 450. The arc surface 495 of the extruding nozzle 450 may preferably be formed in an arc having the same curvature as the curvature of the circumferential surface 11 of the mold roll 10, not necessarily limited thereto though. This arc surface 495 cooperates with the mold roll 10 for molding the substrate 910 of the surface fastener 900 and is a surface opposed to the circumferential surface 11 of the mold roll 10, thus may be referred to as "opposed surface".

The extruding nozzle 450 may supply the melted resin to the circumferential surface 11 of the mold roll 10 through the extruding mouth 490 so that the melted resin may be pushed into the mold cavities 12 at the circumferential surface 11 of the mold roll 10 and may be filled into the mold space between the circumferential surface 11 of the mold roll 10 and the lower arc surface 495 at the extruding mouth 490 of the extruding nozzle 450. The engaging elements 920 of the surface fastener 900 are molded by the mold cavities 12, and the substrate 910 of the surface fastener 900 is molded by the mold space between the circumferential surface 11 of the mold roll 10 and the arc surface 495 of the extruding nozzle 450.

The extruding nozzle 450 may be configured arbitrarily as far as being provided with a molding surface which is opposed to the circumferential surface 11 of the mold roll 10 and which corporate with the circumferential surface 11 to mold the substrate 910 of the surface fastener 900. The extruding nozzle 450 according to the present example may have the extruding mouth 490 being wider along the rotational axis of the mold roll 10. The channel provided in the extruding nozzle 450 may have an axial channel 411, intermediate plenum 412, coupling channels 413, and discharging plenum 414. The intermediate plenum 412 and the discharging plenum 414 are mutually connected via the plural coupling channels 413 which are arranged in parallel and are arranged along the wider width direction of the extruding mouth 490. The opening of the discharging plenum 414 may form the extruding mouth 490.

Hereinafter, specific configuration of the surface fastener molding apparatus 100 may be described in detail. As shown in FIGS. 1 to 5, the surface fastener molding apparatus 100 may axially support the axial left end 13 of the mold roll 10 having the rotational axis AX10 in a rotatable manner by the use of a left-side bearing 530 in the left-side supporting structure (first supporting structure) 50; and may axially support the axial right end 16 of the mold roll 10 in a rotatable manner by the use of a right-side bearing 560 in a right-side supporting structure (second supporting structure) 80. The axial left end 13 may be provided at a first end side of the mold roll 10, and the axial right end 16 may be provided at a second end side opposite to the first end side of the mold roll.

The surface fastener molding apparatus 100 may be equipped, as a drive source for the mold roll 10, with an electric motor 444 which may be controlled by a controller (controlling means) 850 shown as a block in FIGS. 2 and 3 to generate rotational force that is directly or indirectly transmitted to the mold roll 10 through any arbitrary power transmission so that the mold roll 110 can be passively rotated. The surface fastener molding apparatus 100 may have a connector 445 that couples the internal channel in the mold roll 10 with an external coolant water circulation channel. The connector 445 may be provided adjacent to the external side of the right-side supporting structure 80, not necessarily limited thereto though.

The left-side supporting structure 50 rotatably supporting the axial left end 13 of the mold roll 10 may be secured to a nut 36 of a left-side ball screw 34 and may be movable forward or backward in accordance with the left-side or right-side rotation of the threaded shaft 35 of the left-side ball screw 34. Similarly, the right-side supporting structure 80 rotatably supporting the axial right end 16 of the mold roll 10 may be secured to a nut 66 of a right-side ball screw 64 and may be movable forward or backward in accordance with the left-side or right-side rotation of the threaded shaft 65 of the right-side ball screw 64. When the mold roll 10 at a retracted position shown in FIG. 2 is advanced to an operating position shown in FIG. 3, both of the left-side ball screw 34 and the right-side ball screw 64 are synchronously controlled and the left and right sides of mold roll 10 will advance at a constant speed. The threaded shaft at each ball screw 34, 64 may be provided with a groove having a predetermined pitch and the travel distance of the nut can be precisely controllable, by the micrometer for example, in accordance with the amount of rotation of the threaded shaft. The maintenance or replacement of the mold roll 10 may be easily possible by retracting the mold roll 10 from the operating position shown in FIG. 3 to the retracted position shown in FIG. 2.

The left-side supporting structure 50 may have a base plate 51, a carriage 52, a side plate 53, and an attachment plate 54 as shown in FIG. 1. The nut 36 of the left-side ball screw 34 may be firmly secured to the side plate 53 and the base plate 51 through any fastening means so that the left-side supporting structure 50 may be mounted onto the nut 36 of the left-side ball screw 34.

Also, the left-side supporting structure 50 may be configured to slide on a pair of first and second linear rails 351, 352 provided on the stage, thereby ensuring the stable linear movement along the axis of the left-side ball screw 34. The first and second linear rails 351, 352 are arranged in parallel on the stage, and threaded shaft 35 of the left-side ball screw 34 is positioned intermediately. In other words, the first and second linear rails 351, 352 are arranged in parallel and positioned lower than the threaded shaft 35 of the left-side ball screw 34.

The carriage 52 provided on the bottom side of the base plate 51 of the left-side supporting structure 50 may be mounted onto the first and second linear rails 351, 352 in a slideable manner. Two carriages 52 may be provided respectively for the first linear rail 351 and the second linear rail 352, but the number of carriages 52 may be increased in accordance with the size and load of the left-side supporting structure 50.

The right-side supporting structure 80 may be configured similarly to the left-side supporting structure 50. Description made above may similarly apply with necessary interchanging of the first and second linear rails 351, 352 by third and fourth linear rails 651, 652; the left-side ball screw 34 by right-side ball screw 64; the base plate 51 by base plate 81; the carriage 52 by carriage 82; the side plate 53 by side plate 83; and the attachment plate 54 by attachment plate 84.

Rotational power generated by a left-side electric motor 31 may be transmitted to the threaded shaft 35 of the left-side ball screw 34 via a left-side speed reducer 32. The left-side ball screw 34 may have a distal end closer to the extruding nozzle 450 of the extruding machine 400, and a proximal end closer to the power source. The distal end is axially supported in rotatable manner by a bearing of a left-side tip axially-supporting portion 37 provided on the stage, and the proximal end is coupled to the output of the left-side speed reducer 32. The left-side speed reducer 32 may intermediate between the left-side electric motor 31 and the left-side ball screw 34 so that the rotational force generated by the left-side electric motor 31 may be decelerated and transmitted to the threaded shaft 35 of the left-side ball screw 34, thereby ensuring greater torque which may sufficiently counteract the supply pressure of the melted resin supplied from the extruding nozzle 450 of the extruding machine 400.

Electric motors may preferably be used as a drive source, and more preferably an electric motor may be used which is provided with a function where its operation is feedback controlled based on the detection of the operating state such as rotational amount, rotational speed and so on. General speed reducers may be used as the left-side speed reducer 32 which reduce the rotational speed by the use of gears and so on and output it. A parallel axis gear speed reducer, planet gear speed reducer and so on may be used. In the present example, appropriate power transmissions (worms and crowns etc.) are utilized so that the left-side electric motor 31 and the left-side speed reducer 32 are orthogonally arranged.

Right-side ball screw 64 may be configured similarly to the left-side ball screw 34 and may be passively rotatable in response to the rotational force generated by a drive source. Description made above may similarly apply with necessary interchanging of the left-side electric motor 31 by right-side electric motor 61; left-side speed reducer 32 by right-side speed reducer 62; and left-side tip axially-supporting portion 37 by a right-side tip axially-supporting portion 67.

As understandable from the above description and a region outlined by a dotted line in FIG. 2, driving means included in the surface fastener molding apparatus 100 may be divided to a left-side linear driver (first linear driving means) 30 for advancing and retracting the left-side supporting structure 50, and a right-side linear driver (second linear driving means) 60 for advancing and retracting the right-side supporting structure 80. Accordingly, the left-side supporting structure 50 and the right-side supporting structure 80 may be independently and linearly displaced in a direction parallel to the travel direction of the mold roll 10, allowing the rotational axis of the mold roll 10 to be out of plumb with the travel direction of the mold roll 110 within a range allowed by the bearings axially supporting the left and right ends of the mold roll 10, thus making it possible to regulate the degree of closeness between the mold roll 10 and the extruding nozzle 450 along a direction of the rotational axis of the mold roll 10. The left-side linear driver 30 may operate to advance and retract the axial left end 13 of the mold roll 10 and the left-side bearing 530 by necessity. Similarly, the right-side linear driver 60 may advance and retract the axial right end 16 of the mold roll 10 and the right-side bearing 560 by necessity.

In this example, the left-side linear driver 30 may include the above-described left-side electric motor 31, the left-side speed reducer 32 and the left-side ball screw 34, but other differently configured power transmission may be adopted as far as the linear driving is ensured. In this example, the right-side linear driver 60 may include the above-described right-side electric motor 61, the right-side speed reducer 62 and the right-side ball screw 64, but other differently configured power transmission may be adopted as far as the linear driving is ensured.

The surface fastener molding apparatus 100 may have a left-side position determining instrument 353 that is adopted to determine a position of left-side supporting structure 50 which is driven by the left-side linear driver 30, a position of left-side bearing 530, and further a position of axial left end 13 of the mold roll 10. The left-side position determining instrument 353 may determine a position of targeted left-side supporting structure 50 by any means such as mechanical, optical, electrical, and magnetic and so on, and may preferably determines an absolute position thereof.

For example, the left-side position determining instrument 353 may be a linear absolute encoder which can determine that absolute position by the use of head along a linear scale. In this instance, the head on the linear scale may be secured to an external surface of the left-side supporting structure 50, thereby enabling the absolute position determination for the left-side supporting structure 50. Alternatively, a marking may be provided at the left-side supporting structure 50, and the displacement of the marking may be optically or magnetically detected for determining the position. The output of the left-side position determining instrument 353 may be coupled to the latter-described controller 850 via a coupling wirings or network.

The surface fastener molding apparatus 100 may have a right-side position determining instrument 653 that is adopted to determine a position of right-side supporting structure 80 which is driven by the right-side linear driver 60, a position of right-side bearing 560, and further a position of axial right end 16 of the mold roll 10. The above description made with respect to the left-side position determining instrument 353 may be similarly applicable to the right-side position determining instrument 653.

The surface fastener molding apparatus 100 may have the controller 850 for controlling the left-side linear driver 30 and the right-side linear driver 60. The controller 850 may include at least one computer and may generate various processing, i.e. various instructions, along with the execution of program by a CPU (Central Processing Unit), in particular allowing independent respective control for the left-side linear driver 30 and the right-side linear driver 60 in this example. In this example, the controller 850 may perform a feedback control of the left-side linear driver 30 in accordance with the output from the left-side position determining instrument 353, and performs a feedback control of the right-side linear driver 60 in accordance with the right-side position determining instrument 653. The processing performed by the controller 850 may be described later. The present exemplary controller 850 comprises of a main computer 851, a left-side driver circuit 853, and a right-side driver circuit 856, but other system configuration may be adopted. In some cases, the driver circuit may be a microcomputer and a kind of computer.

The surface fastener molding apparatus 100 may have a pachymeter 859 that is adapted to measure the thickness of the substrate 910 of the surface fastener 900 transferred by the pick-up roll 110 as shown in FIG. 4. An operator may manipulate the main computer 851 in accordance with a measurement value by the pachymeter 859 to control the left-side linear driver 30 and right-side linear driver 60 so that the operating position of the mold roll 10 may be regulated. If the output of the pachymeter 859 is coupled to the controller 850, the controller 850 may autonomously control the left-side linear driver 30 and the right-side linear driver 60 in accordance with the output of the pachymeter 859 such that the operating position of the mold roll 10 can be changed.

Specific configuration of the pachymeter 859 may be arbitrary, and it is envisaged that a type of instrument that gauge-measures the thickness of the substrate 910 of the surface fastener 900 or a type of instrument that optically measures may be utilized. The pachymeter 859 may not necessarily be incorporated into the surface fastener molding apparatus 100, and it would be possible to measure the molded surface fastener at a constant time interval using a pachymeter 859 (micrometers and so on) that can be hand-held by an operator.

The extent of the mold space for the substrate 910 of the surface fastener 900 as described with reference to FIG. 4 at the beginning may fluctuate for various causes. For example, the supply pressure of the melted resin supplied from the extruding nozzle 450 may fluctuate, and the extent of the mold space may possibly fluctuate. Alternatively, the mold roll 10 may be deformed due to hear transmitted from the melted resin supplied from the extruding nozzle 450, possibly changing the extent of the mold space. Mechanical support such as axial support for the mold roll 10 may be necessary for disposing the mold roll 10, and the above-described pressure or heat fluctuation may affect or greatly affect the axially-supporting mechanism for the mold roll 10.

Even if the relative position between the extruding nozzle 450 and the mold roll 10 was precisely irrevocably initialized, there may also be a possibility where the thickness of the substrate 910 of the surface fastener 900 may fluctuate as being influenced when the surface fastener molding apparatus 100 operates. Moreover, in this case, maintenance for the surface fastener molding apparatus 100 may require a re-installation of the removed mold roll 10, obstructing the operation of the surface fastener molding apparatus 100.

It may be envisaged that the above-described fluctuation of the mold space for the substrate 910 of the surface fastener 900 may be compensated by configuring the mold roll 10 movable along a single axis using one ball screw and so on. However, according to the testing performed by the present inventors, it has been turned out that even such a configuration had been adopted, the above-described fluctuation of the mold space for the substrate 910 of the surface fastener 900 caused from various factors may not be remedied.

In the present embodiment, the driving means included in the surface fastener molding apparatus 100 may be divided to the left-side linear driver 30 and the right-side linear driver 60 which are capable of moving the left-side supporting structure 50 (left-side bearing 530) and the right-side supporting structure 80 (right-side bearing 560), respectively. Here, the degree of closeness between the mold roll 10 and the extruding nozzle 450 along the mold roll 10 across the axial left end 13 to the axial right end 16 may be regulated based on at least one activation of, exemplary and typically only one of the left-side linear driver 30 and the right-side linear driver 60.

According to such a configuration, dynamical compensation may be possible even the extent of the mold space for the substrate 910 of the surface fastener 900 was fluctuated for various causes, thus the thickness of the substrate 910 of the molded surface fastener 900 will be much highly stabilized. The stabilization of the thickness of the substrate 910 of the surface fastener 900 may contribute in avoiding the production of irregular surface fastener 900, in increasing the production yield of the surface fastener 900, and in decreasing the production cost for the surface fastener 900. As individual control of positions of the axial left end 13 and the axial right end 16 of the mold roll 10 is possible, thickness control of the substrate 910 of the surface fastener 900 may be more easily achievable.

Hereinafter, more detailed description will follow in regard to the regulatable degree of closeness between the mold roll 10 and the extruding nozzle 450 along the mold roll 10 across the axial left end 13 and the axial right end 16, based on at least one activation of the left-side linear driver 30 and the right-side linear driver 60.

As schematically shown in FIG. 6, the left-side bearing 530 axially supporting the axial left end 13 of the mold roll 10 may have an outer ring 531, an inner ring 532, and rolling elements 533, and a not-illustrated retainer. The outer ring 531 may be secured to the attachment plate 54 of the left-side supporting structure 50, and the inner ring 532 may be secured to the axial left end 13 of the mold roll 10. The inner ring 532 may be freely rotatable with respect to the outer ring 531 through the assisting rolling of the rolling elements 533. Any type of bearing may be adoptable and the rolling element may be a ball, cylinder, or a combination thereof, for example. The rolling elements may be pressurized. The right-side bearing 560 may be configured similarly to the left-side bearing 530.

As understandable from the schematic view of FIG. 7, when a difference is caused between the positions of the axial left end 13 and the axial right end 16 of the mold roll 10 in the travel direction of the mold roll 10 based on at least one activation of the left-side linear driver 30 and the right-side linear driver 60, the rotational axis AX10 of the mold roll 10 that is perpendicular to the travel direction of the mold roll 10 may pivot clockwise or counterclockwise when FIG. 7 is viewed in front, i.e. axial misalignment may be caused. As an example, when the rotational axis AX10 of the mold roll 10 is oriented perpendicular to the travel direction of the mold roll 10 and then the axial right end 16 is moved relative to the axial left end 13 by several micrometer forward, the rotational axis AX10 of the mold roll 10 may pivot counterclockwise around the axial left end 13 as schematically shown in FIG. 7 when the figure is viewed in front, and the axial right end 16 of the mold roll 10 may be positioned closer to the extruding nozzle 450 than the axial left end 13.

As schematically shown in FIG. 8, the right-side bearing 560 has been moved slightly forward compared to the left-side bearing 530, and the rotational axis of the mold roll 10 has been pivoted counterclockwise when FIG. 8 is viewed in front. In this case, the backward force may be applied to the inner ring 532 of the left-side bearing 530 from the axial left end 13 of the mold roll 10, and the forward force may be applied to the inner ring 532 of the right-side bearing 560 from the axial right end 16 of the mold roll 10. The rotation of the inner ring 532 relative to the outer ring 531 at each bearing may be ensured even such forces are being applied.

As schematically shown in FIG. 9, when the left-side bearing 530 has been slightly moved forward relative to the right-side bearing 560 and the rotation axis of the mold roll 10 has been pivoted clockwise, the backward force may be applied to the inner ring 532 of the right-side bearing 560 from the axial right end 16 of the mold roll 10, and the forward force may be applied to the inner ring 532 of the left-side bearing 530 from the axial left end 13 of the mold roll 10. The rotation of the inner ring 532 relative to the outer ring 531 at each bearing may be ensured even such forces are being applied.

The maximum allowable offset amount between the left-side bearing 530 and the right-side bearing 560 in the travel direction of the mold roll 10 may be, for example, 0.35 mm, allowing the rotational axis AX10 of the mold roll 10 to pivot within 0.05 degree clockwise or counterclockwise. According to the present embodiment, the rotational axis AX10 of the mold roll 10 are configured to be moveable in the front-back direction relative to the left-side and right-side supporting structure 50, 80 so that one end of the rotational axis AX10 can pivot relative to the other end of the rotational axis AX10.

The operation of the surface fastener molding apparatus 100 will be described with reference to FIG. 10. It should be noted that a control program has already been installed in the main computer 851 of the controller 850, each component in the controller 850 has been activated. Required power has been supplied to the drive source and other motorized equipment included in the surface fastener molding apparatus 100. The computer may typically be comprise of an arithmetic processing unit such as a representative CPU (Central Processing Unit), and a storage such as representative hard-drive and memory, and may additionally comprise of auxiliary components such as a display, an input device, an output device, and a communication device and so on. In the computer, the CPU execute the control program stored in the hard drive successively so that various control instructions may be generated along with such an execution, for example. The controller 850 may not be necessarily configured solely depending on software control, but wired-logic or ASIS (Application Specific Integrated Circuits) and so on may be utilized wholly or partially.

First, an operator may input an instruction for advancing the mold roll 10 from the retracted position to the operating position using the input device such as a mouth of the main computer 851 of the controller 850 so that the mold roll 10 of the surface fastener molding apparatus 100 may be advanced from the retracted position to the operating position (S71). In accordance with the instruction for advancing which is input by the operator, the main computer 851 may transmit a drive signal for advancing to both of the left-side driver circuit 853 and the right-side driver circuit 856 so that the left-side supporting structure 50 and the right-side supporting structure 80 are instructed to advance until they reach a predetermined operating position. The respective operating position of the left-side supporting structure 50 and the right-side supporting structure 80 stated in this paragraph may correspond to the operating position of the mold roll 10.

The left-side driver circuit 853 may receive from the main computer 851 the instruction for advancing, and may generate and supply to the left-side electric motor 31 a drive signal for causing the movement toward the operating position specified by the instruction for advancing. Accordingly, the shaft of the left-side electric motor 31 may rotate and this rotational force is transmitted to the threaded shaft 35 of the left-side ball screw 34 via the left-side speed reducer 32, allowing the nut 36 on the threaded shaft 35 to advance and also allowing the left-side supporting structure 50, the left-side bearing 530, and the axial left end 13 of the mold roll 10 to advance.

Similarly, the right-side driver circuit 856 may receive from the main computer 851 the instruction for advancing, and may generate and supply to the right-side electric motor 61 a drive signal for causing the movement toward the operating position specified by the instruction for advancing. Accordingly, the shaft of the right-side electric motor 61 may rotate and this rotational force is transmitted to the threaded shaft 65 of the right-side ball screw 64 via the right-side speed reducer 62, allowing the nut 66 on the threaded shaft 65 to advance and also allowing the right-side supporting structure 80, the right-side bearing 560, and the axial right end 16 of the mold roll 10 to advance.

Accordingly, the mold roll 10 at the retracted position shown in FIG. 2 may be advanced to the operating position shown in FIG. 3 so that the mold roll 10 closely faces the extruding mouth 490 of the extruding nozzle 450 as shown in FIGS. 4 and 5, and the mold space for the substrate 910 of the surface fastener 900 may be defined between the circumferential surface 11 of the mold roll 10 and the arc surface 495 at the extruding mouth 490 of the extruding nozzle 450.

It may be preferable to confirm if the mold roll 10 has been moved to the operating position specified by the main computer 851. For example, the left-side driver circuit 853 included in the controller 850 may compare the current absolute position indicated by the output value of the left-side position determining instrument 353 and the target absolute position specified by the instruction for advancing received from the main computer 851, and may determine if the left-side supporting structure 50 has been properly moved by the left-side linear driver 30. The target absolute position stated in this paragraph may be understood as an equivalent or correspondent of the above-described operating position. The moving toward the operating position does mean the moving toward the target absolute position, however, the operating position may not necessarily be identical with the target absolute position as errors may possibly be caused during the actual movement. The left-side driver circuit 853 may drive the left-side electric motor 31 in accordance with a difference between the current absolute position and the target absolute position if any, and may perfectly match the current absolute position with the target absolute position.

Next, the surface fastener molding apparatus 100 may activate the circulation of coolant water through the control of the main computer 851 by the operator, or through the autonomous control by the main computer 851, or through the autonomous or the operator-instructed control by a controlling system independent of the controller 850 (S72). For example, the main computer 851 may start the cooling of the mold roll 10 by activating a coolant water circulator (not illustrated) for circulating the coolant water in the mold roll 10.

Next, the surface fastener molding apparatus 100 may start the rotation of the mold roll 10 through the control of the main computer 851 by the operator, or through the autonomous control by the main computer 851, or through the autonomous or the operator-instructed control by a controlling system independent of the controller 850 (S73). For example, the main computer 851 may supply a rotation signal to the electric motor 44 for driving and rotating the mold roll 10. Accordingly, the shaft of the electric motor 44 may rotate and this rotational force may be transmitted to the axial portion of the mold roll 10 directly or through any power transmission so that the mold roll 10 is rotated at a predetermined speed. Any manner for controlling the electric motor 44 by the main computer 851 may be adopted, and the operation of the electric motor 444 may be controlled by a pair of rotation start signal and a rotation stop signal. In this case, the rotational speed of the electric motor 444 may be specified by the rotation start signal.

Next, the extruding machine 400 may start the supply of the melted resin through the control of the main computer 851 by the operator, or through the autonomous control by the main computer 851, or through the autonomous or the operator-instructed control by a controlling system independent of the controller 850 (S74). For example, the extruding machine 400 may supply the melted resin at a predetermined speed and at a predetermined supply pressure into its channel from a raw material tank storing the melted material using a built-in pump and so on so that the melted resin is supplied to the circumferential surface 11 of the mold roll 10 through the extruding mouth 490 of the extruding nozzle 450. The mold roll 10 is being rotated and the mold cavities 12 of the mold roll 10 may be filled by the melted resin. The melted resin may be molded between the circumferential surface 11 of the mold roll 10 and the arc surface 495 at the extruding nozzle 450. The surface fastener 900 may be formed continuously on the circumferential surface 11 of the mold roll 10 as schematically shown in FIG. 4. The melted resin on the circumferential surface 11 of the mold roll 10 may be cooled by the mold roll 10, and may be cooled by a coolant water in a water pool (not illustrated) disposed below the mold roll 10 so that the melted resin may be solidified while its molded shape between the mold roll 10 and the arc surface 495 of the extruding nozzle 450 is maintained.

Next the posture of the mold roll 10 may be regulated through the control by the controller 850 (S75). In regard to this feature, detail description will be presented with reference to FIGS. 11 to 13. As shown in FIG. 11, the surface fastener molding apparatus 100 may take an autonomous control state in which the position of the mold roll 10 is autonomously controlled in accordance with the fluctuation in the supply pressure of the melted resin supplied from the extruding nozzle 450 during the continuous manufacturing of the surface fastener 900 (S751). Also, the surface fastener molding apparatus 100 may detect the thickness of the substrate 910 of the surface fastener 900 using the pachymeter 859 (S752). Further, the surface fastener molding apparatus 100 may control the left-side linear driver 30 and right-side linear driver 60 autonomously or throught the operator in accordance with the measured value by the pachymeter 859 to change the operating position of the mold roll 10 (S753).

Step S751 will be described with reference to FIG. 12. As shown in FIG. 12, at time t1, the supply pressure of the melted resin may become greater than the initial value. Then, both of or one of the position of the axial left end 13 or the axial right end 16 of the mold roll 10 may be moved away from the extruding nozzle 450. That is, the current absolute position will shift from the target absolute position. It is assumed that only the axial left end 13 of the mold roll 10 is retracted, for the purpose of explanation, hereinafter.

The left-side position determining instrument 353 are measuring the current absolute position of the left-side supporting structure 50 at highly time-resolved manner, and rapidly transmit, to the left-side driver circuit 853, the determined current absolute position if the axial end position is displaced. The left-side driver circuit 853 comperes the target absolute position instructed by the main computer 851 and the received current absolute position from the left-side position determining instrument 353, and generates and transmits the drive signal to the left-side electric motor 31 for driving the left-side linear driver 30 and for advancing the nut 36 of the left-side ball screw 34 for the sake of compensating the difference. The left-side electric motor 31 may rotate its shaft in a direction in accordance with the input signal, and this force is transmitted to the threaded shaft 35 of the left-side ball screw 34 via the left-side speed reducer 32. The threaded shaft 35 is rotated and the nut 36 is advanced along the threaded shaft 35. Accordingly, the axial end position will get back to the previous operating position, immediately correcting the thickness fluctuation of the surface fastener 900.

At time t4, the supply pressure of the melted resin is lowered. Then, the axial end position of both or one of the axial left end 13 and the axial right end 16 of the mold roll 10 will move closer to the extruding nozzle 450. This is because force for advancing the mold roll 10 is applied to the mold roll 10 in order to counteract the supply pressure of the melted resin from the extruding nozzle 450. It is assumed that only the axial left end 13 of the mold roll 10 is advanced, for the purpose of explanation.

The left-side position determining instrument 353 may rapidly transmit, to the left-side driver circuit 853, the determined current absolute position if the axial end position is displaced. The left-side driver circuit 853 comperes the target absolute position instructed by the main computer 851 and the received current absolute position from the left-side position determining instrument 353, and generates and transmits the drive signal to the left-side electric motor 31 for driving the left-side linear driver 30 and for advancing the nut 36 of the left-side ball screw 34 for the sake of compensating the difference. The left-side electric motor 31 may rotate its shaft in an opposite direction in accordance with the input signal, and this force is transmitted to the threaded shaft 35 of the left-side ball screw 34 via the left-side speed reducer 32. The threaded shaft 35 is rotated and the nut 36 is advanced along the threaded shaft 35. Accordingly, the axial end position will get back to the previous operating position, immediately correcting the thickness fluctuation of the surface fastener 900.

Steps S752 and S753 will be described with reference to FIG. 13. As shown in FIG. 13, at time t1, the thickness of the substrate 910 of the surface fastener 900 measured by the pachymeter 859 increases to pass through the threshold value and to be out of the targeted range. In response, the operator may manipulate the input device of the main computer 851 manually to regulate the posture of the mold roll 10 by activating the one of or both of the left-side linear driver 30 and the right-side linear driver 60. Specifically, the operator may try to compensate the thickness fluctuation of the substrate 910 of the surface fastener 900 by changing the target absolute position of the mold roll 10.

For example, the operator may manually manipulate the input device of the main computer 851 to instruct the left-side linear driver 30 to perform the movement operation toward the target absolute position that is advanced by several micrometer. The main computer 851 may transmit the instruction (COMFoRwARD) indicating the target absolute position to the left-side driver circuit 853. The left-side driver circuit 853 may compare the current absolute position determined by the left-side position determining instrument 353 and the target absolute position, and may generate and transmit, to the left-side electric motor 31, the signal reflecting that difference. Then, the shaft of the left-side electric motor 31 may rotate and, finally the position of the axial left end 13 of the mold roll 10 may be moved closer to the extruding nozzle 450, and the posture of the mold roll 10 is regulated. In a case of FIG. 13, the substrate thickness of the surface fastener 900 may recover to the target value. However, if it does not work so, the operator may instruct for the left-side linear driver 30 another target absolute position retracted by several micrometer. Alternatively, an instruction similar to above may be sent to the right-side linear driver 60. Some trial and error may contribute for the recovery of the substrate thickness of the surface fastener 900 within a target range.

With respect to Steps S752 and S753, the controller 850 may possibly perform the autonomous control in accordance with the output of the pachymeter 859. When the output of the pachymeter 859 indicates an increase/decrease in the thickness of the substrate 910 of the surface fastener 900, the controller 850 may instruct at least one of the left-side linear driver 30 and the right-side linear driver 60 to perform the movement toward the target absolute position that is advanced and/or retracted by a distance in accordance with the change in thickness, and confirm if the thickness fluctuation of the substrate 910 of the surface fastener 900 has been compensated or not by referring to the output of the pachymeter 859. If an amount of the fluctuation was deteriorated and not improved, the controller 850 may instruct a movement in an opposite direction in contrast to the previous instruction.

The drive signal and drive instruction and so on are schematically illustrated in binary value or multilevel in FIGS. 12 and 13, however these supplemental and schematic illustration is only for promoting the understanding, and the drive signal or drive instruction may be configured according to a common communication technique between apparatuses.

Based on the above teachings, the skilled person in the art could add various modifications to the respective embodiments. The reference numbers in claims are just for a reference and should not be referenced for narrowly construing the claimed scope. Any specific mechanical configuration or any computer related specific system configuration may be adoptable. Any type of bearing may be adoptable. Any specific configuration of the linear driver may be adoptable.

REFERENCE SIGNS LIST

100 Surface fastener molding apparatus
10 Mold roll
11 Circumferential surface
13 axial left end
16 axial right end
530 Left-side bearing (First bearing)
560 Right-side bearing (Second bearing)
30 Lest-side linear driver (First linear driver)
34 Ball screw
35 Threaded shaft
36 Nut
60 Right-side linear driver (Second linear driver)
64 Ball screw
65 Threaded shaft
66 Nut
50 Left-side supporting structure (First supporting structure)
80 Right-side supporting structure (Second supporting structure)

The invention claimed is:

1. A surface fastener molding apparatus comprising:
a mold roll including a plurality of mold cavities for molding engaging elements of a surface fastener, the mold roll being adapted to be positioned adjacent to an extruding mouth of an extruding machine to define an interspace between the mold roll and the extruding mouth of the extruding machine, a thickness of a substrate of the surface fastener corresponding to the interspace;
first and second supporting structures configured to axially support first and second ends of the mold roll respectively, the first end being opposite to the second end;
first and second driving units configured to advance or retract the first and second supporting structures respectively;
a controller configured to transmit a drive signal to at least one of the first and second driving units for advancing or retracting the first and/or second supporting structures, wherein
operation of at least one of the first and second driving units in accordance with the drive signal allows a rotational axis of the mold roll to pivot such that the first end of the mold roll is positioned closer to the extruding mouth than the second end or the second end of the mold roll is positioned closer to the extruding mouth than the first end, wherein
the first and second supporting structures include first and second bearings respectively, the first bearing being coupled with the first end of the mold roll and the second bearing being coupled with the second end of the mold roll, and wherein
a degree of the pivoting of the rotational axis is within a range allowed by the first and second bearings.

2. The surface fastener molding apparatus of claim 1, wherein the first and second driving units are controller by the controller such that displacements of the first and second ends of the mold roll are compensated independently.

3. A method of producing surface fasteners using a surface fastener molding apparatus of claim 1.

4. The surface fastener molding apparatus of claim 1, wherein each of the first and second driving units includes a motor, a speed-reducer and a ball screw, a torque caused by the motor being transferred to the ball screw through at least the speed-reducer.

5. The surface fastener molding apparatus of claim 4, wherein
the ball screw includes a threaded shaft and a nut movable along the threaded shaft, and wherein each of the first and second supporting structures is mounted onto one or more linear rails, the one or more linear rails being arranged in parallel to the threaded shaft of the ball screw.

6. The surface fastener molding apparatus of claim 5, wherein the first supporting structure is fixed to the nut of the ball screw of the first driving unit, and the second supporting structure is fixed to the nut of the ball screw of the second driving unit.

7. The surface fastener molding apparatus of claim 1, further comprising first and second position determining units configured to determine positions of the first and second supporting structures respectively, an output of the first and second position determining units are transferred to the controller.

8. The surface fastener molding apparatus of claim 7, wherein the first and second driving units are controller by the controller such that displacements of the first and second ends of the mold roll are compensated independently.

9. The surface fastener molding apparatus of claim 8, wherein the controller is configured to compare a target absolute position and a current absolute position, the current absolute position being indicated by an output value from the first or second position determining unit.

10. The surface fastener molding apparatus of claim 1, wherein the mold roll is movable between an operating position where the mold roll bears a supply pressure of melted material flowing out from the extruding mouth and a retracted position where the mold roll is positioned farther away from the extruding mouth compared to the operating position.

11. The surface fastener molding apparatus of claim 10, wherein operation of at least one of the first and second driving units in accordance with the drive signal allows the rotational axis to be oriented not perpendicular to a travel direction of the mold roll from the retracted position to the operating position.

12. The surface fastener molding apparatus of claim 11, wherein the first and second supporting structures include first and second bearings respectively, and wherein the angle of the rotational axis relative to the travel direction is within a range allowed by the first and second bearings.

\* \* \* \* \*

UNITED STATES PATENT AND TRADEMARK OFFICE
CERTIFICATE OF CORRECTION

PATENT NO. : 10,723,046 B2  
APPLICATION NO. : 16/407431  
DATED : July 28, 2020  
INVENTOR(S) : Atsunori Sugimoto et al.

Page 1 of 1

It is certified that error appears in the above-identified patent and that said Letters Patent is hereby corrected as shown below:

In the Specification

In Column 2, Line 32, delete "the" and insert -- The --, therefor.

In Column 2, Line 44-48, delete "one end of the rotational axis (AX10) of the mold roll (10) may preferably pivot relative to the other end of the rotational axis (AX10) based on at least one control of the first driving means (30) and the second driving means (60) by the controlling means (850)." and insert the same on Column 2, Line 43, as a continuation of the same paragraph.

In Column 2, Line 50, delete "positon" and insert -- position --, therefor.

In Column 15, Line 67, delete "throught" and insert -- through --, therefor.

In Column 17, Line 12, delete "(COMFoRwARD)" and insert -- (COM$_{FORWARD}$) --, therefor.

Signed and Sealed this  
Fifteenth Day of September, 2020

Andrei Iancu  
*Director of the United States Patent and Trademark Office*